Figure 1:
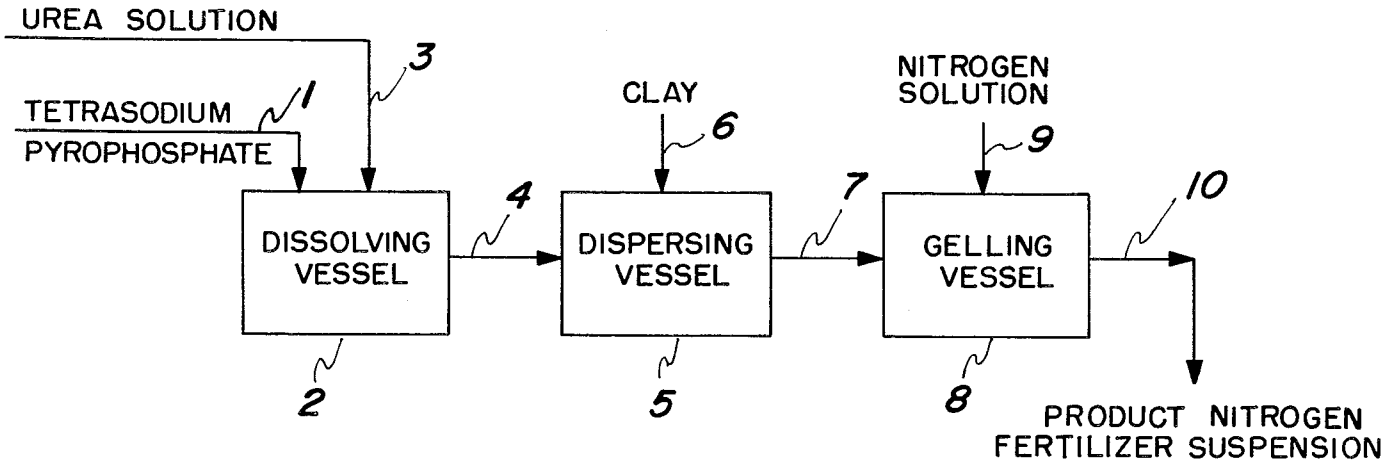
Figure 2:
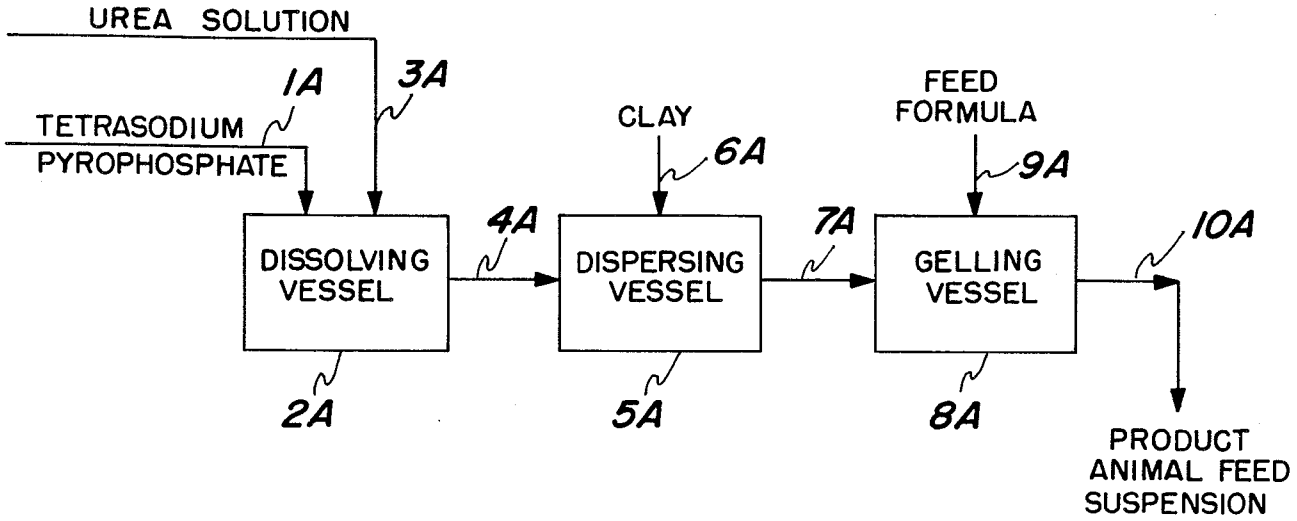

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED OCTOBER 5, 1976

951 O.G. 7

T951,006

FERTILIZER AND FEED SUPPLEMENT SUSPENSIONS

John G. Getsinger, Florence, Ala., assignor to Tennessee Valley Authority

Filed Aug. 22, 1975, Ser. No. 606,754
Int. Cl.² C05C 9/00
U.S. Cl. 71—28
2 Sheets Drawing. 12 Pages Specification

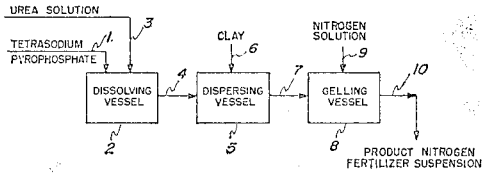

DISPERSING AND GELLING CLAY IN PRODUCTION OF NITROGEN FERTILIZER SUSPENSION

A process for the production of improved nitrogen fertilizer suspension and improved feed supplement suspension by dispersing attapulgite clay in a urea solution with a dispersing agent and adding the dispersed clay to a nitrogen fertilizer solution or an animal feed supplement formulation to cause the clay to gel. The concentration of the dispersed clay can be as high as 30 percent, and the urea concentration can be as high as 45 percent, and with a concentration of clay in the gel state (that is, nitrogen solution or animal feed supplement) of 2 percent, high gel strength is obtained with only moderate agitation and with less dilution of the products. The fertilizer products are useful in making mixed high-nitrogen suspensions that also contain phosphorus and potassium by blending nitrogen base suspension, phosphate base suspension, and solid potassium chloride. The animal feed supplement suspension products are useful in suspending solid mineral nutrients.

DISPERSING AND GELLING CLAY IN PRODUCTION OF NITROGEN FERTILIZER SUSPENSION

DISPERSING AND GELLING CLAY IN PRODUCTION OF ANIMAL FEED SUPPLEMENT SUSPENSIONS